United States Patent [19]

Nakajima et al.

[11] Patent Number: 4,865,794

[45] Date of Patent: Sep. 12, 1989

[54] METHOD OF INTEGRALLY MOLDING MEMBER ONTO PORTION OF RIGID MEMBER

[75] Inventors: Yasuyoshi Nakajima, Kiryu; Takao Umezawa; Takashi Momiyama, both of Gunma; Yoichi Inoue, Kiryu, all of Japan

[73] Assignee: Mitsuba Electric Manufacturing Co., Ltd., Gunma, Japan

[21] Appl. No.: 180,227

[22] Filed: Apr. 11, 1988

[30] Foreign Application Priority Data

Apr. 13, 1987 [JP] Japan .................................. 62-91540
Apr. 13, 1987 [JP] Japan ............................ 62-56466[U]

[51] Int. Cl.⁴ ....................... B29C 45/14; B29C 33/12
[52] U.S. Cl. ........................................ 264/278; 249/52; 249/95; 264/274; 264/318; 425/125
[58] Field of Search ............... 264/273, 274, 278, 275, 264/242, 318; 425/125; 249/91, 95, 52

[56] References Cited

U.S. PATENT DOCUMENTS

| | | | |
|---|---|---|---|
| 2,110,091 | 3/1938 | Morse | 264/278 |
| 2,361,348 | 10/1944 | Dickson et al. | 264/278 |
| 2,838,100 | 6/1958 | Follows | 264/275 |
| 2,890,505 | 6/1959 | Brand | 249/91 |
| 2,973,501 | 2/1961 | Mapeloden et al. | 264/275 |
| 3,044,127 | 7/1962 | Alden | 264/275 |
| 3,103,703 | 9/1963 | Ludewig | 264/275 |
| 3,238,287 | 3/1966 | Chapman | 264/278 |
| 3,259,680 | 7/1966 | Schelke | 264/275 |
| 3,328,504 | 6/1967 | Hamel | 264/318 |
| 3,363,040 | 1/1968 | Aoki | 264/279 |
| 3,591,669 | 7/1971 | Membry | 264/242 |
| 4,210,478 | 7/1980 | Shoney | 264/275 |
| 4,470,786 | 9/1984 | Sano et al. | 425/125 |
| 4,582,384 | 4/1986 | Frantz et al. | 264/273 |

*Primary Examiner*—James Lowe
*Attorney, Agent, or Firm*—Rodman & Rodman

[57] ABSTRACT

A method of integrally molding a member to be molded onto a portion of a rigid member, which method is applied to manufacture of a connecting rod used in a crank device of a wiper system in a motor vehicle, for example. In this method of molding, a portion to be positioned is formed in the rigid member, a portion of the rigid member is inserted into a cavity for molding the member to be molded in such a manner that the portion to be positioned is exposed in the cavity, positioning members linearly movably provided in this cavity are engaged with this portion to be positioned to effect positioning, the positioning members are retracted to the outside of the portion to be positioned after the positioning, and thereafter, a molding material is poured into the cavity to mold the member to be molded. The rigid member has a mounting hole integrally molded therein with the resinous member to be molded, slits are provided on the inner peripheral surface of the member to be molded, and the mounting hole formed such that the inner diameters of portions of the mounting hole as opposed to said slits are decreased.

5 Claims, 6 Drawing Sheets

METHOD OF INTEGRALLY MOLDING MEMBER ONTO PORTION OF RIGID MEMBER

BACKGROUND OF THE INVENTION

1. Field of the Invention

This invention relates to a method of molding, more particularly to a method of integrally molding a member to be molded onto a portion of a rigid member, and is concerned with a molding method being effectively utilized in manufacturing a connecting rod used in a crank device of a wiper system in a motor vehicle for example.

2. Description of Related Art

In general, in a wiper system for wiping a window glass of a motor vehicle, a crank device is used to convert rotary motion of a wiper motor into rocking motion of a wiper arm. In the crank device of this type, a connecting rod integrally molded (hereinafter referred to as "outsert molded") at opposite end portions of a rod with joint members made of resin may be used.

There is a known method of outsert molding of the joint member made of resin in the connecting rod of this type, wherein a small hole is formed as a portion to be positioned, at or near the end of the rod, and raised portions are formed at portions outside of a cavity of an outsert molding tool, whereby, when the rod is inserted into the cavity, the raised portions are coupled into the small hole, and the rod is properly positioned to the cavity, so that the center-aligned state of the rod and the joint member can be properly secured after the outsert molding.

However, in the method of outsert molding of the type described, such disadvantages are presented that, since the small hole is formed in the rod, the rod is lowered in mechanical strength. Moreover, since the small hole as being the portion to be positioned is exposed to the outside of the joint member after the outsert molding, the visual appearance is deteriorated, and further, center-alignment cannot be secured under the condition where the small hole cannot be formed.

SUMMARY OF THE INVENTION

An object of the present invention is to provide a method of molding, wherein, while a portion to be positioned is embedded in a member to be molded, mounting accuracy of a predetermined value can be secured.

The method of molding according to the present invention features that, in the method of integrally molding a member to be molded onto a portion of a rigid member, a portion to be positioned is formed in the rigid member, a portion of the rigid member is inserted into a cavity for molding the member to be molded in such a manner that the portion to be positioned is exposed in the cavity, positioning members linearly movably provided in this cavity are engaged with this portion to be positioned to effect positioning, the positioning members are retracted to the outside of the portion to be positioned after the positioning, and thereafter, a molding material is poured into the cavity to mold the member to be molded.

According to the method of molding of the present invention, when the rigid member is inserted into the cavity, the linearly moveable positioning members provided in the cavity are engaged with the portion to be positioned which was previously formed on the rigid member, whereby the position of the rigid member to the cavity is regulated, so that the accuracy of mounting the member to be molded by the cavity to the rigid member can be secured.

On the other hand, the positioning members are retracted to the outside of the portion to be positioned after the positioning, so that the traces of the positioning members do not come into contact with the rigid member after the molding. Furthermore, the portion to be positioned is previously formed on the rigid member so as to be received in the cavity, whereby the portion to be positioned is embedded into the molded member after the molding, so that the portion to be positioned will not be exposed to the outside.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DETAILED DESCRIPTION OF THE PREFERRED EMBODIMENT

Figure 1:
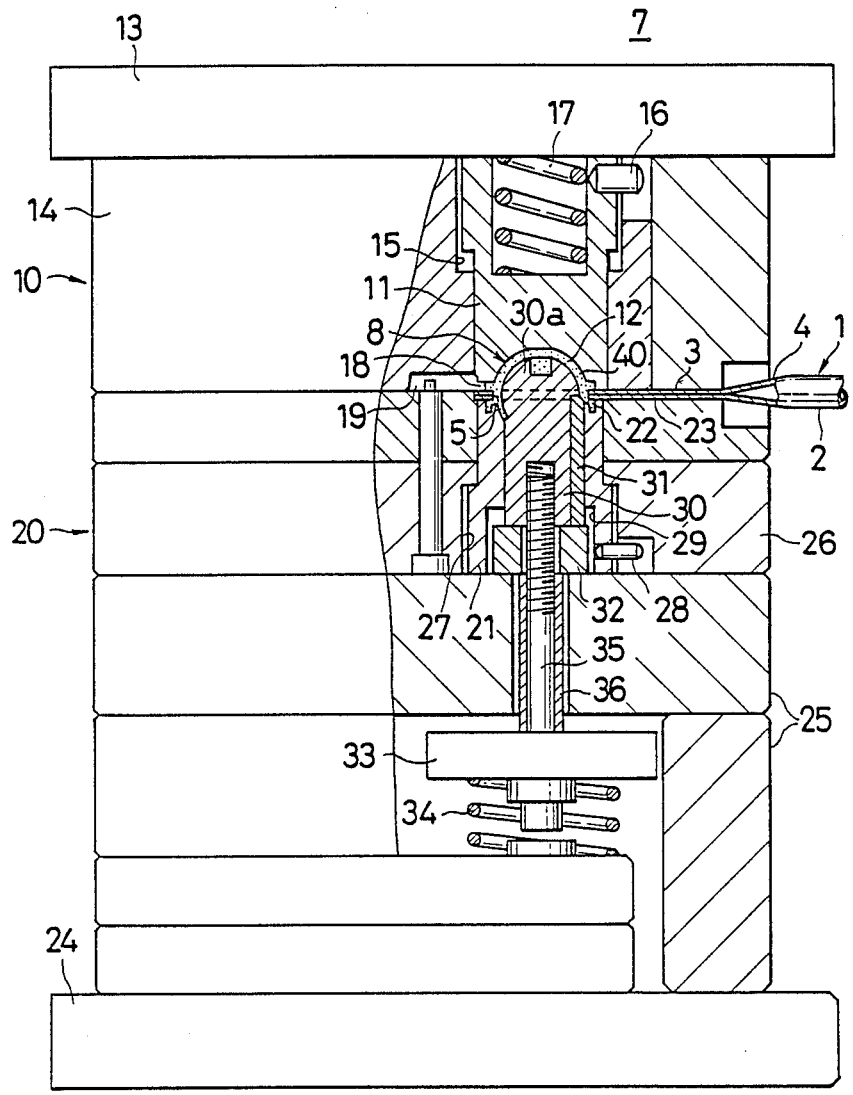
FIG. 1 is a partially cutaway side sectional view showing a step of outsert molding in a process of manufacturing the connecting rod embodying the present invention.

The outsert molding method in this embodiment is used for outsert molding joint members each made of resin as being a member to be molded onto opposite end portions of a connecting rod as being a rigid member in a process of manufacturing the connecting rod, and is worked by use of outsert molding equipment as shown in FIG. 1 and so forth.

Figure 3:
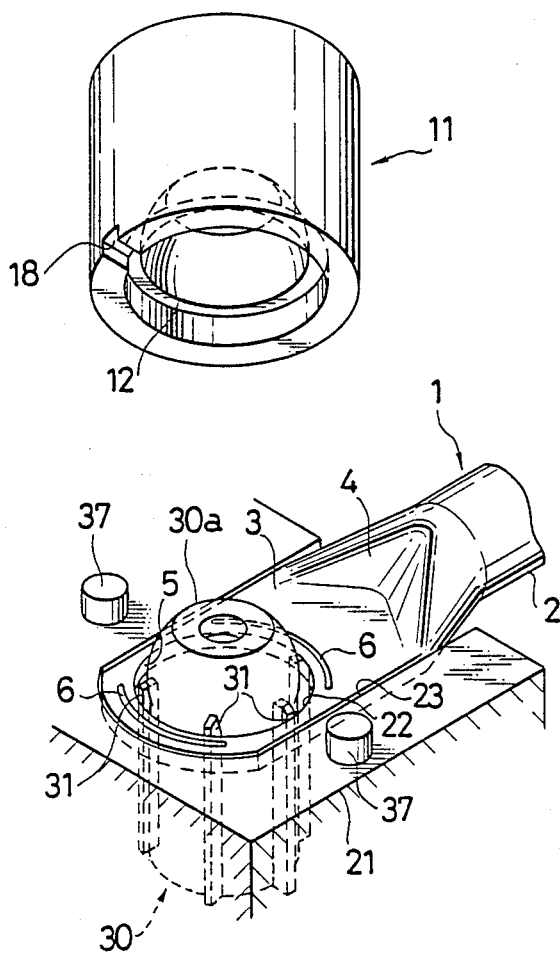
FIG. 3 is an enlarged, partially exploded perspective view of the mold cavity blocks thereof and the member to be molded.
Figure 6:
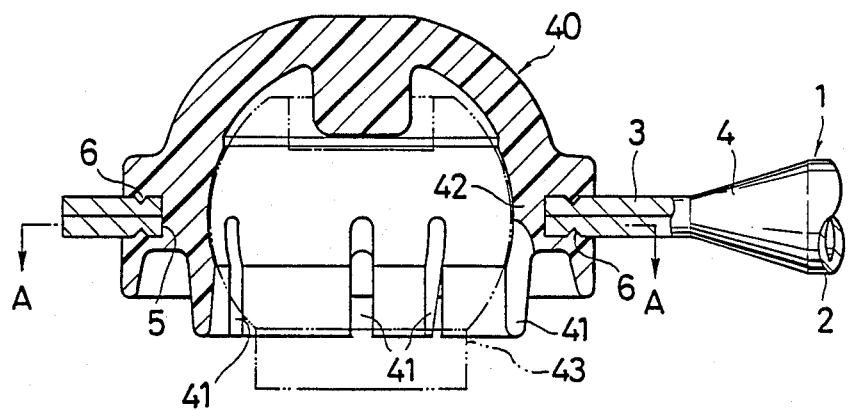
FIG. 6 is an enlarged, partial sectional view showing a molded product.

In this embodiment, a rod 1 outsert molded at the opposite end portions thereof with the joint members is a connecting rod used in a crank device of a wiper system in a motor vehicle. This rod 1 is constructed such that a round pipe is previously, integrally formed by press work into such a form that which is shown in FIGS. 3 and 6 (only partially shown). The rod 1 is generally formed into a pipe form, and formed at opposite end portions thereof (only one end portion is shown) with mounting portions 3, each of which is flattened into an oval shape having a width broader than the width of the pipe-shaped portion and outsert molded thereto with each of the joint members. A connecting portion 4 for connecting the pipe-shaped portion 2 to the flat plate-shaped mounting portion 3 in the rod 1 by matching or absorbing the difference in shape therebetween is formed into a continuously changing form having a generally M letter-shaped section, in which the top wall thereof is recessed in a moderately curved manner, height of the section being progressively reduced from the pipe-shaped portion 2 to the mounting portion 3 and the width of the section being progressively increased. The mounting portion 3 of the rod 1 is concentrically formed with a mounting hole 5, which is outsert molded thereto with the joint member. This mounting hole 5 can perform a function as a portion to be positioned during outsert molding. The mounting portion 3 is provided on the front and rear surfaces thereof with pairs of V letter-shaped grooves 6, which are concentrically formed in circularly arcuate shapes at positions close to the mounting hole 5. The opposite ends of thee pair of grooves 6 and 6 are separated from each other at positions opposed to straight-lined portions formed at opposite sides of the mounting portion 3.

On the other hand, an outsert molding equipment 7 used in this embodiment has a top force member 10 and a bottom force member 20, which are mold-registered by a clamping cylinder device, not shown. The top force member 10 and the bottom force member 20 are mounted on mounting plates which relatively approach or separatingly move from each other. The top force member 10 has a cavity block 11 and the bottom force member 20 a cavity block 21, respectively. At mating mold surfaces between the both blocks 11 and 21, a top force member recess 12 and a bottom force member recess 22 are formed respectively, so as to cooperate to form a cavity 8 to outsert mold the joint member at one side of the rod. The top force member recess 12 is formed into a hollow chamber of a generally trapezoidal conical shape and the bottom force member recess 22 a hollow chamber of a generally disc-shape.

A top holding block 14 is fixedly suspended from a top mounting plate 13 by use of bolts or the like. This block 14 is formed therethrough in the vertical direction with a guide hole 15 of a generally two-stage columnar shape. The top force member cavity block 11 is vertically slidably coupled into the guide hole 15 in a manner to be locked against rotation by a rotation-locking pin 16, and engaged with a shoulder of the guide hole 15, so that the top force cavity block 11 is held to be linearly movable relative to the holding block 14 with a predetermined stroke. The cavity block 11 is constantly biased downwardly by a compression spring 17 confined between the mounting plate 13 and the cavity block 11. A gate 18 is formed at the mating mold surface of the top cavity block 11 such that resin as being a molding material can be poured into the cavity 8, and the gate 18 communicates with a runner 19 formed in the holding block 14.

On the other hand, a rod receiving recess 23 of complementary shape identical with the end portion of the rod 1 is recessed at the mating mold surface of the bottom force member cavity block 21 in a manner to be overlapped on the bottom force member cavity recess 22. This rod receiving recess 23 extends in a direction opposite the gate 18 of the top force member cavity block 11.

Furthermore, a bottom holding block 26 is supported by a bottom mounting plate 24 through a spacer 25. This block 26 is formed therethrough with a holding hole 27 formed into a generally two-stage columnar hollow shape. The bottom force member cavity block 21 is inserted through the holding hole 27 in such a manner that the bottom force member cavity block 21 is locked against rotation by a rotation-locking pin 28. A guide hole 29 formed into a generally two-stage columnar hollow shape is provided in the cavity block 21 concentrically therewith, penetrating therethrough in the vertical direction. A core 30 formed into a generally columnar shape as a whole is vertically slidably coupled into the guide hole 29. A spherical shaft-shaped portion 30a is formed on the top end portion of this core 30 so as to be able to form a spherical bearing portion.

A plurality of positioning members 31 are provided around the outer periphery of the core 30 generally equidistantly in the circumferential direction, extending in parallel to the axis of the core 30 and being raised radially. The outermost diameter of the positioning members 31 is at a value substantially equal to the diameter of the mounting hole 5 of the rod 1. A collar 32 is abutted against the bottom ends of the core 30 and the group of the positioning members 31. The collar 32 is vertically movable in a lower large diameter portion of the guide hole 29 until the collar is engaged with a stepped portion formed between an upper small diameter portion and the lower large diameter portion, whereby upper limit and lower limit positions of the core 30 and the positioning members 31 are defined.

A movable plate 33 is supported over the mounting plate 24 in a manner to be constantly upwardly biased by a compression spring 34. A push-up bar 35 and a push-up sleeve 36 concentric with the axis of the core 30 for vertical movement along the axis of the core 30 of the push-up sleeve 36 penetrates through the spacer 25 and is abutted against the bottom end face of the collar 32. The top end portion of the push-up bar 35 is inserted through the push-up sleeve 36 and concentrically, threadably coupled into the bottom end portion of the core 30. Furthermore, a pair of push-down bars 37 are provided at the right and left sides of the push-up sleeve 36 and fixed onto the movable plate 33 in a manner to be erected vertically. The top end portions of the both push-down bars 37 are slidably inserted through the spacer 25 and the holding block 26 and projected upwardly from the top surface of the bottom force member 20.

The method of molding the joint member onto the previously formed rod by use of the outsert molding equipment with the above-described arrangement will hereunder be described.

Figure 2:
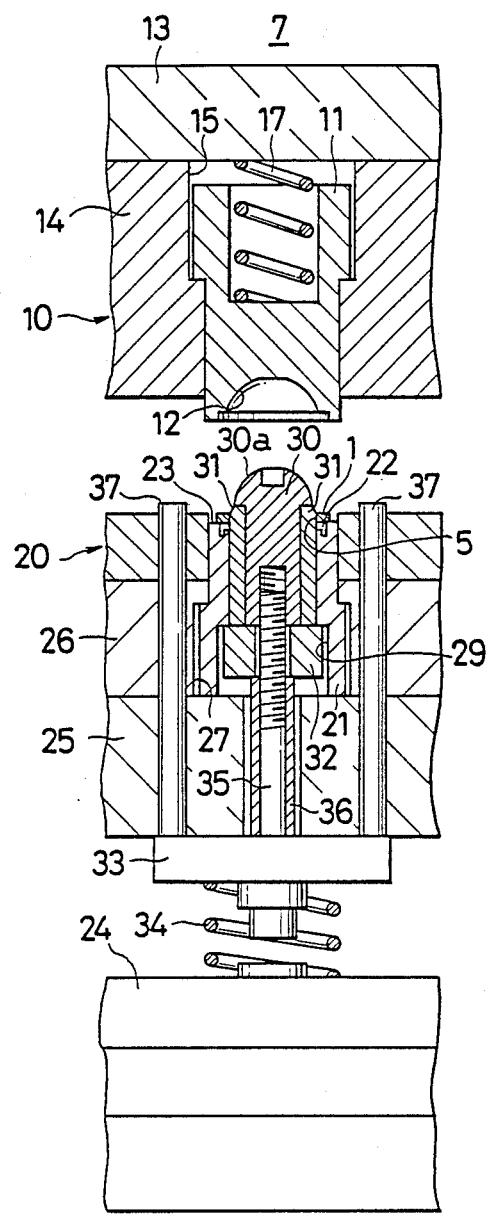
FIG. 2 is a partial front sectional view showing another step.

When the top force member 10 and the bottom force member 20 are opened in the outsert molding equipment 7, the movable plate 33 is pushed up by the spring 34 as shown in FIG. 2, whereby the core 30 and the positioning members 31 are set at the upper limit positions.

In this state, the mounting portion 3, the connecting portion 4, a portion of the pipe-shaped portion 2 of the rod 1 are coupled into the rod receiving recess 23, whereby the rod 1 is set in the bottom force member 20. At this time, as shown in FIGS. 2 and 3, the inner peripheral surface of the mounting hole 5 formed in the mounting portion 3 of the rod 1 and the outer surfaces of the group of the positioning members 31, which are radially raised on the outer periphery of the core 30 of the bottom force member 20 are coupled to each other.

Here, the outer diameter of the group of the positioning members 31 is set so as to be center-aligned with the cavity recess 32, so that, even when the rod receiving recess 23 is formed to be larger than the outer shape of the rod 1 and so forth from the necessity of absorbing errors in press work, the mounting hole 5 of the rod 1 and the cavity 8 of the molding tool can be center-aligned with each other at high accuracy by coupling of the group of the positioning members 31 into the mounting hole 5.

Subsequently, when the top force member 10 is relatively lowered by the clamping cylinder device to be mold-registered to the bottom force member 20, the rod 1 is clamped between the top force member 10 and the bottom force member 20 to be inserted into the cavity 8 as shown in FIG. 1.

Figures 4, 5:
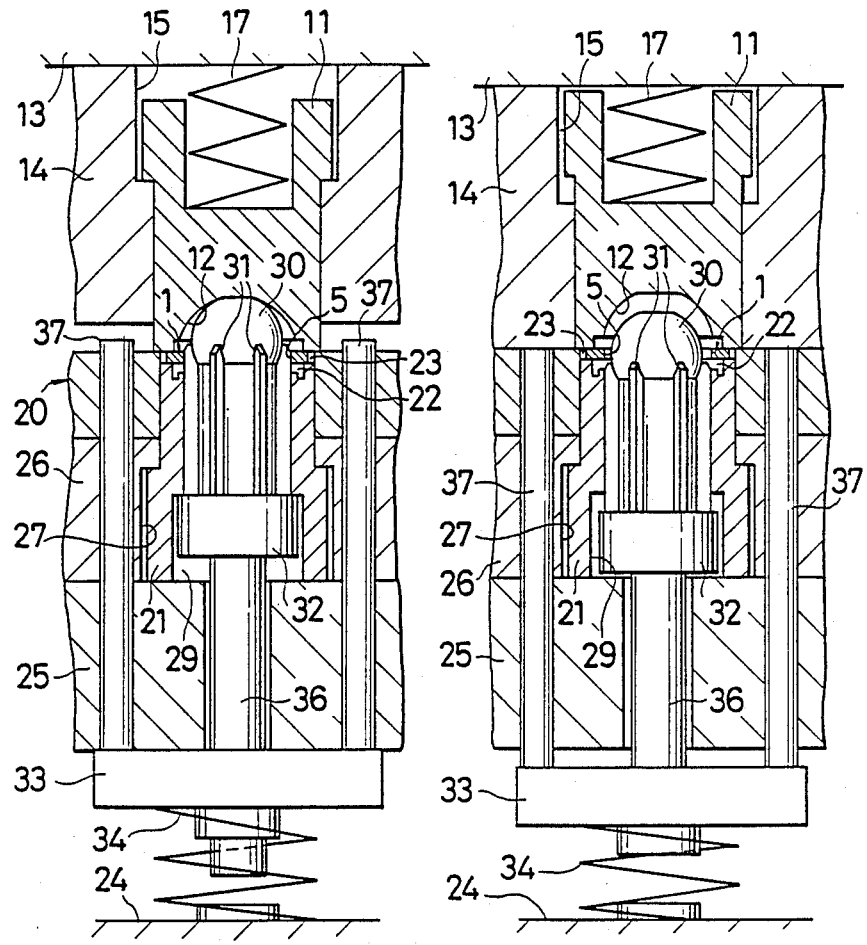
FIGS. 4 and 5 are enlarged, partial sectional views showing other steps, respectively.

Here, when the top force member 10 is relatively lowered, the top force member cavity block 11 is pushed down relative to the holding block 14 by the spring 17 as shown in FIG. 4, whereby, first, the top force member cavity block 11 is urged against the rod 1 which is set onto the bottom force member 20. Accordingly, the rod 1 is held between the top force member 10 and the bottom force member 20 before the group of the positioning members 31 are extracted from the mounting hole 5 as will described hereunder, so that the accuracy of center-aligning between the mounting hole 5 of the rod 1 and the cavity 8 can be maintained is.

When the top force member 10 is further lowered after the top force member cavity block 11 is urged against the bottom force member 20, the spring 17 which makes the top force member cavity block 11 protrude is compressively deformed, whereby this cavity block 11 is relatively pushed into the holding block 14, sliding in the guide hole 15, so that the holding block 14 is lowered and registered onto the holding block 26 of the bottom force member 20.

When the top force member 10 and the bottom force member 20 are registered to each other, the push-down bars 37 are pushed down by the top force 10 against the resiliency of a spring 34 which pushes up the movable plate 33 as shown in FIG. 5, so that the movable plate 33 is pushed down to the lower limit position. When the movable plate 33 is pushed down to the lower limit position, the core 30 and the group of the positioning members 31 are set to the lower limit position, i.e. a proper molding position in the cavity 8 through the push-up bar 35 and the push-up sleeve 36, which are fixed to the movable plate 33. With this arrangement, the group of the positioning members 31 are projected to the outside of the mounting hole 5 of the rod 1, whereby the center-aligned state is released.

Thereafter, when the molding material is poured through the gate 18 to fill the cavity 8, a spherical socket joint or spherical bearing member 40 as being the joint member is molded as shown in FIG. 1. At this time, the mounting portion 3 of the rod 1 is inserted in the cavity 8, whereby the spherical bearing member 40 is outsert molded integrally on the mounting portion 3 of the rod 1 which mounting portion 3 can also be referred to as a locating portion or a portion to be positioned in the cavity 8. The mounting hole 5 of the rod 1 and the cavity 8 are center-aligned with each other, so that the spherical bearing member 40 molded by the cavity 8 can be integrally secured to the rod 1 in a state of being center-aligned with the mounting hole 5 of the rod 1.

Here, in this embodiment, the lower limit positions of the positioning members 31 are set in a manner to be slightly protruded into the bottom force member cavity recess 22 during molding as shown in FIG. 1, so that a plurality of slits 41 are simultaneously molded on the inner peripheral surface of the bottom end portion of the spherical bearing member 40 as shown in FIG. 6. The positioning members 31 thus serve as part of the molding die for forming the slits 41. As will be described hereunder, due to the group of the slits 41, work of removing the spherical bearing member from the core and work of pushing the spherical shaft into the spherical bearing member can be easily realized. The slits 41 thus facilitate coupling of the spherical shaft into the spherical bearing member 40.

When molding of the spherical bearing member 40 is completed, the top force member 10 is relatively raised to be separated from the bottom force member 20. When the top force member 10 is separated, the core 30 and the positioning members 31 are pushed up by the push-up bar 35 and the push-up sleeve 36 to be restored to the initial upper limit positions, because the movable plate 33 is biased upwardly by the spring 34.

Subsequently, the rod 1 is demounted from the bottom force member 20. At this time, the inner periphery of the bottom end portion of the spherical bearing member 40 is engaged with the outer periphery of the core 30, however, work of mold-releasing of the core 30 from the spherical bearing member 40 can be comparatively easily performed because the slits 41 are provided on the inner peripheral surface of the bottom end portion of the spherical bearing member 40 as described above.

Figure 7:
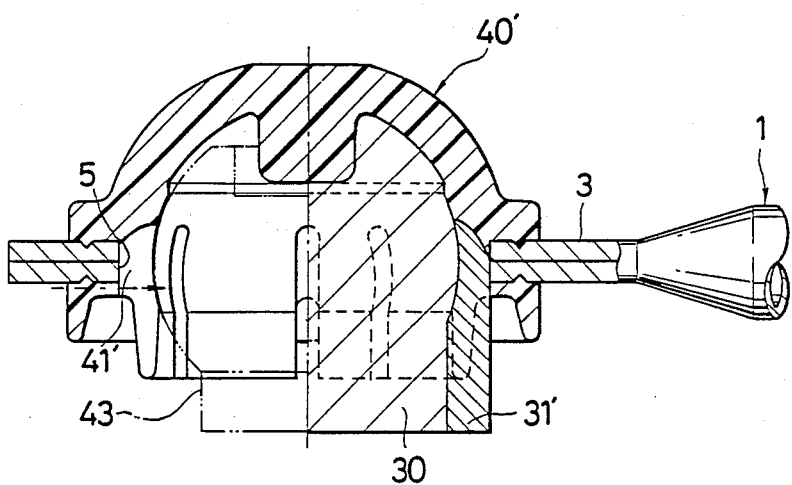
FIG. 7 is an enlarged, partial, longitudinal sectional view for explaining the action.

Now, as shown in FIG. 7, it may be thought of that the cavity 8 is filled up with resin to outsert-mold a spherical bearing member 40' in a state where a group of positioning members 31' are abutted against the inner peripheral surface of the mounting hole 5 of the rod 1. However, in this case, in this spherical bearing member 40', slits 41' penetrating to reach the mounting hole 5 is formed by the positioning members 31'. If the slits 41' penetrate to reach the mounting hole 5 as described above, then water intrudes into the spherical bearing portion 40' through a water intruding route indicated by an arrow in FIG. 7, whereby wear occurs on the spherical bearing surface.

However, in this embodiment, upon completion of positioning operation by the engagement of the positioning members 31 with the mounting hole 5 of the rod 1, the positioning members 31 are released from the engagement and retracted during molding of resin, so that the positioning members 31 will not make the slits 41 formed in the spherical bearing member 40 reach the mounting hole 5. In short, a wall thickness portion 42 of a predetermined value is interposed between the bottoms of the slits 41 and the inner peripheral surface of the mounting hole 5. Accordingly, the water intruding route is shut off at this wall thickness portion 42 as indicated by an arrow mark in FIG. 6, whereby water does not intrude into the spherical bearing member 40, with the result that occurrence of wear due to water intrusion can be avoided in advance.

Figure 8:
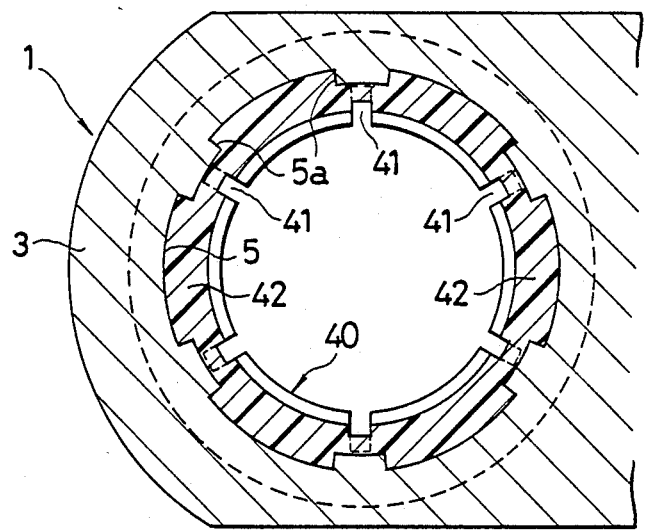
FIG. 8 is a planar sectional view taken along the line A—A in FIG. 6.
Figure 9:
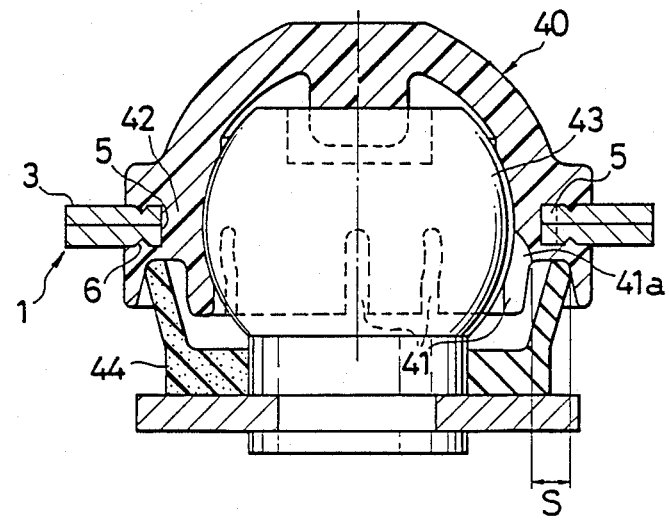
FIG. 9 is an enlarged, partial, longitudinal sectional view showing the assembled state.

This arrangement will be more apparent by FIGS. 8 and 9.

More specifically, as shown in FIG. 8, a plurality of small-diameter portions 5a are provided on the inner periphery of the mounting hole 5 of the rod 1 equidistantly in the circumferential direction, being raised inwardly in the radial direction. These small diameter portions 5a are provided at positions opposed to the positioning members, i.e. the slits to be molded by these positioning members, which will be described hereunder. The inner diameters of the small diameter portions 5a are determined to coincide with the outer diameter of the group of the positioning members, so that the small diameter portions 5a can perform a function as the portion to be positioned during outsert molding.

In passing, when the connecting rod as being the joint device, which has been manufactured by the above-described method, is used in a crank device of a wiper system, as indicated by hypothetical lines in FIG. 6, the spherical shaft 43 thereof is pushed into the spherical bearing member 40, and one end of a shaft, not shown, of a crankarm or a wiper arm, the other end of which is fixed to an output shaft of a wiper motor, not shown, is solidly secured to the spherical shaft 43 by a proper means such as clinching work or the like. When the spherical shaft 43 is pushed into the spherical bearing member 40, the push-in work can be comparatively easily carried out because the slits 41 are provided at an opening, through which the spherical bearing shaft 40 is pushed in.

When the connecting rod is actually mounted onto the wiper system, not shown, as shown in FIG. 9, a seal member 44 is interposed between the spherical bearing member 40 and the spherical shaft 43 so as to prevent water from intruding to the spherical bearing surface. At this time, the seal member 44 is brought into pressing contact with the external portions of the group of slits 41 of the spherical bearing member 40, to thereby maintain the sealed state, so that a seal allowance s thereof depends on the outermost diameter of the group of the slits 41, i.e. the depth of the slits 41. In short, it is desirable that the bottoms 41a of the slits 41 are separated from the inner peripheral surface of the mounting hole 5 as much as possible.

In this embodiment, the slits 41 are molded by the positioning members 31 simultaneously with the spherical bearing member 40, and the outermost diameter of the group of the positioning members 31 is determined to be equal to the inner diameter of the small diameter portions 5a inwardly raised from the mounting hole 5, so that the outermost diameter of the group of the slits 41 is positioned more inwardly than the inner diameter of the mounting hole 5 by a value of inward raising of the small diameter portion 5a. Accordingly, the seal allowance s of the spherical bearing member 40 for the seal member 44 is increased by a value of that the outermost diameter of the group of the slits draws toward the interior.

On the other hand, during operation of the wiper system, in the spherical bearing member 40 of a connecting rod 39, the maximum load is applied to the wall thickness portion 42 positioned on the axial line of the rod 1. However, in this embodiment, the wall thickness portion 42 positioned on the axial line of the rod 1 is formed thicker by a value of that the small diameter portions 5a are not raised, so that the wall thickness portion 42 can sufficiently bear the maximum load.

The small diameter portions 5a are provided on the inner periphery of the mounting hole 5 in a manner to be opposed to the slits 41 of the spherical bearing member 40 as described above, whereby a degree of freedom can be given to both the design in depth of the slits 41 and in thickness of the wall thickness portion 42 of the spherical bearing member 40, so that properly conceived designs in the seal allowance and the maximum load of the connecting rod as a whole can be realized.

Furthermore, the small diameter portions 5a raised from the inner periphery of the mounting hole 5 are brought into a state of biting at the spherical bearing member 40, so that the small diameter portions 5a can function as rotation-locking portions for preventing the spherical bearing member 40 from rotating about the mounting hole 5.

On the other hand, the grooves 6 provided on the front and rear surfaces of the mounting portion 3 of the rod 1 are formed into continuous circular annular shapes, whereby the grooves 6 do not function as rotation-locking portions. However, the grooves 6 perform radial move preventing function, water intruding route shut-off function and the like.

In passing, the resin for molding the spherical bearing member 40 shrinks during curing. At the time of this shrinkage, if the grooves 6 are of uncontinuous annular shapes, then differences partially occur in distribution of the value of shrinkage, so that distortions occur in the spherical bearing member 40. However, in this embodiment, the grooves 6 are formed of the circular annular shapes, so that no distortion occurs at the time of shrinkage.

Incidentally, the present invention need not necessarily be limited to the above embodiment, and can be variously modified without departing from the gist of the invention.

For example, the lower limit positions of the positioning members need not necessarily be limited to the provision of the slits on the inner peripheral surface of the spherical bearing member upon releasing of the positioning operation, and the positioning members may be retracted to positions coinciding with the inner surface of the cavity.

The positioning members need not necessarily be limited to be made to linearly move by the utilization of the open-close operations of the top and bottom force or the spring, and may be made to linearly move under sequence control by use of an electromagnetic plunger system, a cylinder system and the like.

It is desirable that the number, length, width and depth of the slits provided in the joint member, the inner diameter, circumferential length and the like of the small diameter portions interposed between the slits and the mounting hole are suitably selected in accordance with a desirable value of the seal allowance, a value of the maximum load acting on the connecting rod, the material quality and size of the rod, the size of the mounting hole, a type of resin used, a degree of adhesion between a rod material and a resin material, and so forth.

In the above embodiment, manufacture of the connecting rod used in the crank device has been described. However, the molding method according to the present invention is applicable to a manufacturing of a joint device in general. For example, this invention is applicable to such as manufacture of a connecting rod used in a retractable head lamp device, outsert molding of the joint member to a link bar in a link device, and so forth.

As has been described hereinabove, according to the present invention, the positioning members linearly movably provided on the cavity are engaged with the portion to be positioned previously formed on the rigid member when the rigid member is inserted into the cavity, whereby the position of the rigid member to the cavity is regulated, so that the mounting accuracy of the member molded by this cavity to the rigid member can be secured. Furthermore, the portion to be positioned is previously formed on the rigid member so as to be received in the cavity, whereby the positioning members can be embedded into the member to be molded after the molding, so that the positioning members can be prevented from being exposed to the outside.

According to the present invention, the small diameter portions are raised from the inner periphery of the mounting hole in a manner to be opposed to the slits, so that the degree of freedom in design of the depth of the slits and the wall thickness portion interposed between the slits and the mounting hole and so forth can be increased.

What is claimed is:

1. A method of integrally molding a spherical socket joint onto a locating portion of a rigid member, wherein a section of said rigid member is inserted into a mold cavity for molding said spherical socket joint in such a manner that said locating portion is exposed in said mold cavity, positioning members linearly movably provided in said cavity are engaged with said locating portion to effect positioning of the locating portion, said positioning members are retracted to the outside of said locating portion after the positioning, and thereafter, a molding material is poured into said cavity to mold said spherical socket joint, while said positioning members are used to serve as part of a molding die for forming slits in an inner peripheral surface of said spherical socket joint to facilitate coupling of a spherical shaft into the spherical socket joint.

2. The method of molding as set forth in claim 1, wherein said locating portion includes a mounting plate hole, said spherical socket joint is integrally molded therein, peripheral portions of said mounting hole opposite said slits are extended toward the center of the mounting hole to provide the mounting hole with decreased inner diameter at said peripheral portions.

3. The method of molding as set forth in claim 2, wherein said rigid member is a connecting rod used in a crank device, and said mounting hole is formed in each opposite end portion of said connecting rod.

4. The method of molding as set forth in claim 3, wherein said connecting rod is outsert-molded in a state where said spherical socket joint is center-aligned with said mounting hole.

5. A method of molding an attachment to a rigid member comprising,
   (a) inserting a portion of the rigid member into a mold cavity,
   (b) positioning the portion of the rigid member with positioning members that partially enter the mold cavity,
   (c) locating a core in the mold cavity to serve as the molding die,
   (d) using the positioning members that partially enter the mold cavity to serve as part of the molding die for forming slits in the attachment that do not reach the rigid member by retracting the positioning members a predetermined amount after the rigid member has been positioned such that the positioning members project from the core in the mold cavity and thereby function as part of the molding die for forming the slits that do not reach the rigid member.

* * * * *

UNITED STATES PATENT AND TRADEMARK OFFICE
CERTIFICATE OF CORRECTION

PATENT NO. : 4,865,794
DATED : September 12, 1989
INVENTOR(S) : Yasuyoshi NAKAJIMA et al.

It is certified that error appears in the above-identified patent and that said Letters Patent is hereby corrected as shown below:

At column 3, line 14, change "thee" to --these--.

At column 4, line 28, after "30" (first occurrence) insert --are fixed onto the moveable plate 33--.

At column 4, same line, after "30" (second occurrence) insert --. The top end portion--.

At column 5, line 21, delete "is".

At column 5, line 33, after "force" insert --member--.

At column 6, line 2, before "group" insert --presence of the--.

At column 9, line 27, delete "plate".

Signed and Sealed this

Fourth Day of September, 1990

Attest:

HARRY F. MANBECK, JR.

*Attesting Officer*  *Commissioner of Patents and Trademarks*